Nov. 18, 1969 C. A. TOMASZEWSKI ET AL 3,479,552

DEFLECTION CIRCUITS

Filed June 4, 1968 2 Sheets-Sheet 1

INVENTORS
CARLOS A. TOMASZEWSKI
ROBERT L. SCARLETT
BY Lindenberg & Freilich
ATTORNEYS INVENTORS
CARLOS A. TOMASZEWSKI
ROBERT L. SCARLETT
BY Lindenberg & Freilich
ATTORNEYS

United States Patent Office 3,479,552

Patented Nov. 18, 1969

3,479,552

DEFLECTION CIRCUITS

Carlos A. Tomaszewski, Canoga Park, and Robert L. Scarlett, Torrance, Calif., assignors to Wyle Laboratories, El Segundo, Calif., a corporation of California Filed June 4, 1968, Ser. No. 734,320
Int. Cl. H01j *29/70*
U.S. Cl. 315—18 7 Claims

ABSTRACT OF THE DISCLOSURE

A cathode ray tube character display system utilizing charge storage deflection circuits. The system includes gross deflection circuitry for causing the beam to trace a plurality of successive lines. Fine deflection circuitry causes the beam to trace a composite stroke pattern at several positions along each line. Blanking means blank selected strokes of the composite pattern to form characters. The gross and fine deflection circuitry, for both the horizontal and vertical axes, utilizes a capacitor which is selectively charged to a level substantially porportional to the desired deflection.

BACKGROUND OF THE INVENTION

Field of the invention

This invention relates generally to cathode ray tube display systems and more particularly to deflection circircuitry for causing the tube beam to trace selected characters.

Description of the prior art

The prior art is replete with various cathode ray tube display systems which incorporate means for causing the tube beam to trace alphanumeric and arbitrary characters. Many such systems incorporate gross deflection and fine deflection circuitry with the latter circuitry causing the beam to trace composite patterns comprised of a plurality of strokes. By blanking selected strokes in the composite pattern, desired characters are displayed.

It is an object of the present invention to provide improved deflection circuitry for a cathode ray tube character display system.

SUMMARY OF THE INVENTION

Briefly, in accordance with the present invention, deflection circuits are employed, for both gross and fine deflection along the horizontal and vertical axes, which utilize a capacitor for accumulating charge. That is, a desired deflection voltage level is developed by selectively charging and discharging a capacitor. In a preferred embodiment of the invention, the capacitor is connected in series with a first transistor switch and sufficient resistance so that closure of the switch will charge the capacitor substantially linearly as a function of time. A field effect transistor, presenting a high impedance to the capacitor, is employed to develop an output deflection signal whose amplitude is substantially proportional to the charge on the capacitor. A second transistor switch is connected in a circuit branch in parallel with the capacitor for controlling the discharge thereof.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2, 3, 4:
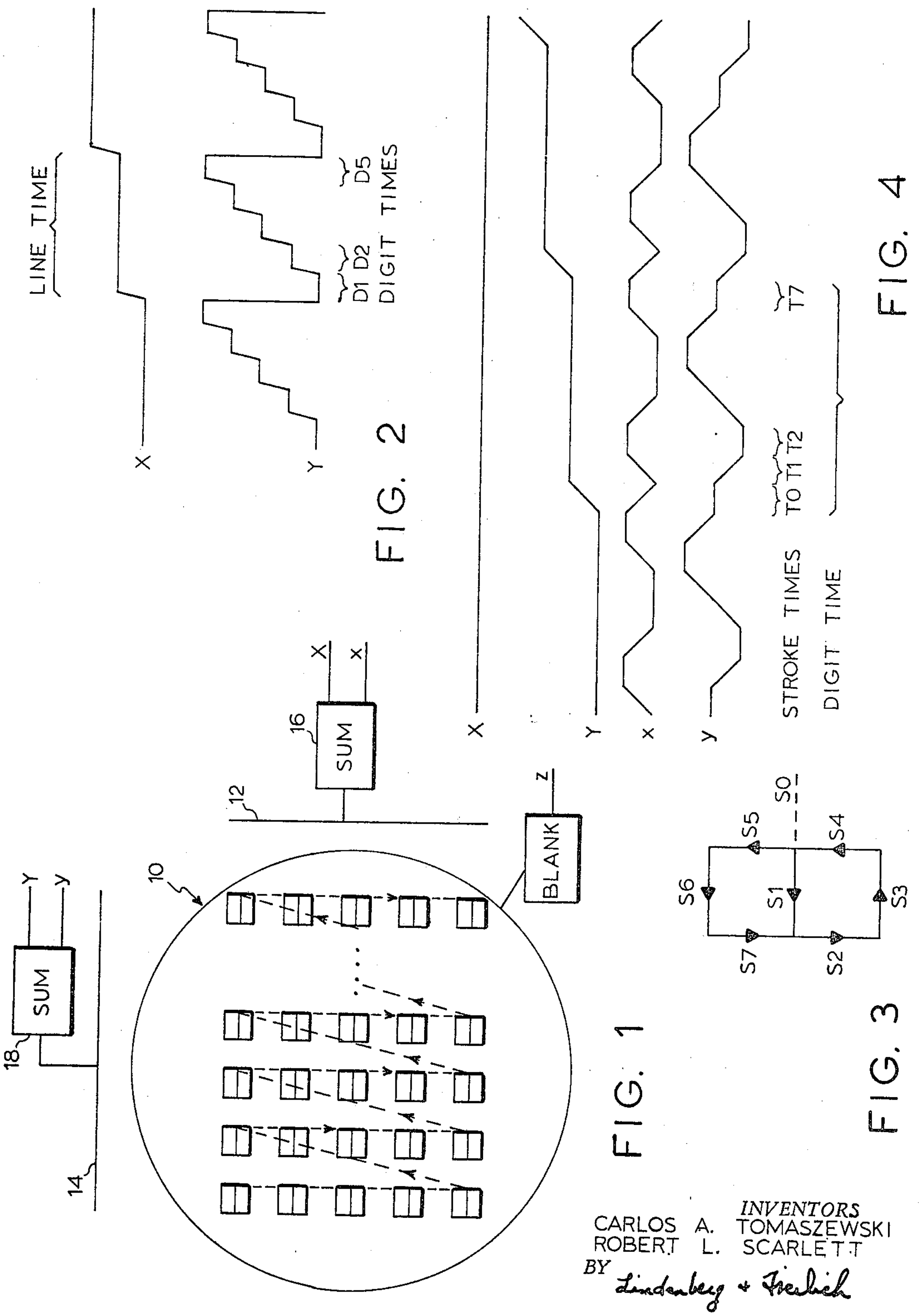
FIGURE 1 is a block diagram of a cathode ray tube display system which can advantageously incorporate the circuit teachings of the present invention.
FIGURE 2 is a waveform chart illustrating gross horizontal and vertical deflection signals for causing the beam to trace successive parallel lines on the cathode ray tube screen.
FIGURE 3 illustrates a composite stroke pattern drawn by the cathode ray tube beam in order to form characters.
FIGURE 4 is a waveform chart illustrating the fine horizontal and vertical deflection signals, and their relationship to the gross deflection signals, used to cause the beam to trace the composite stroke pattern shown in FIGURE 3.
Figure 5:
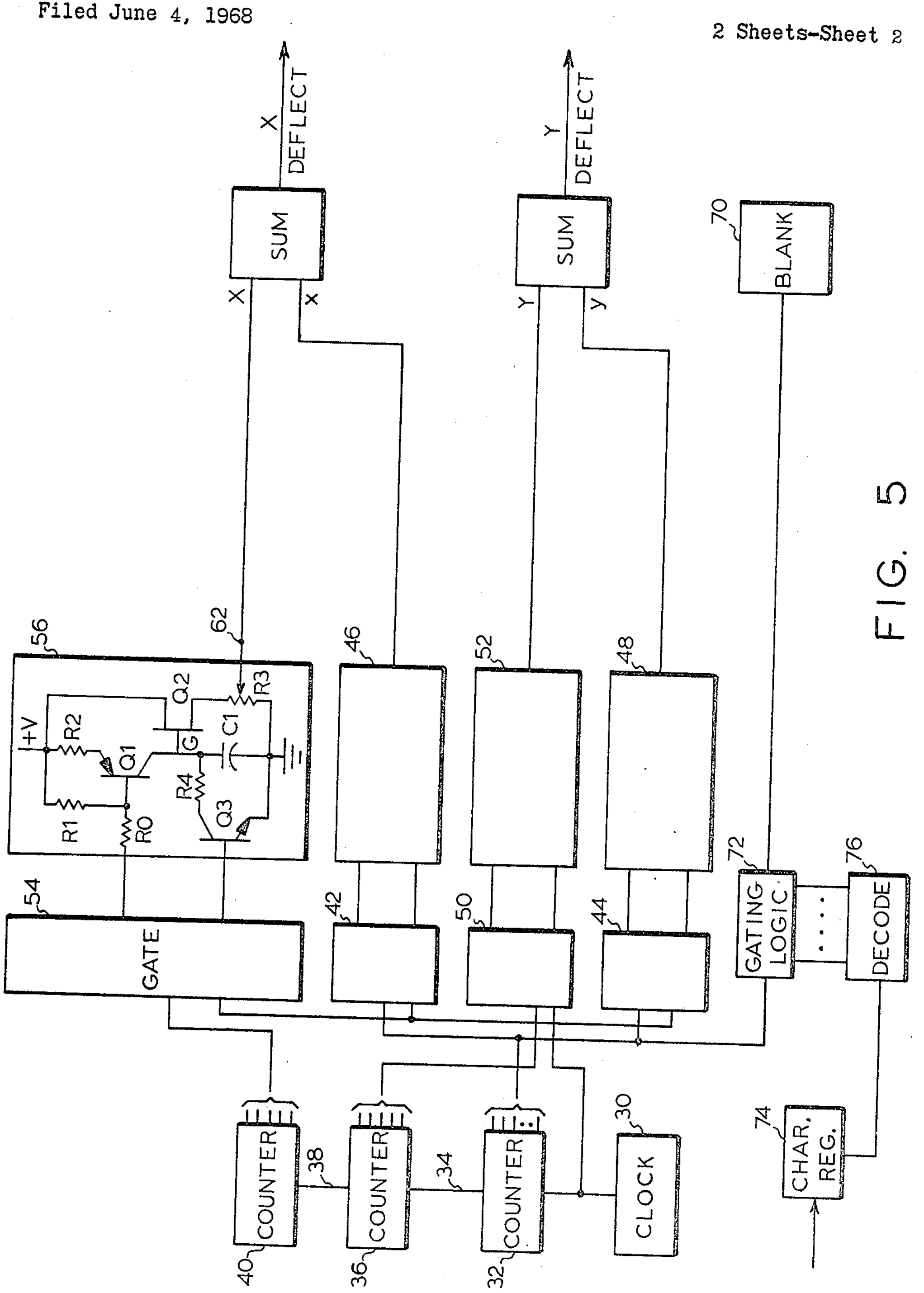
FIGURE 5 is a block schematic diagram illustrating a preferred embodiment of the invention.

Attention is now called to FIGURE 1 which illustrates a block diagram of a cathode ray tube display system which can advantageously employ the teachings of the present invention. The system of FIGURE 1 includes a cathode ray tube 10 having a horizontal deflection means 12 and a vertical deflection means 14. A horizontal deflection signal is applied to the deflection means 12 by a summing means 16. The summing means 16 is responsive to a gross horizontal deflection signal X and a fine horizontal deflection signal $x$. Similarly, a vertical deflecttion signal is applied to the vertical deflection means 14 by a summing means 18. The summing means 18 is responsive to a gross vertical deflection signal Y and a fine vertical deflection signal $y$. The present invention is primarily directed to a circuit system, as shown in FIGURE 5, for producing the deflection signals X, Y, $x$, $y$.

By properly controlling the horizontal and vertical gross deflection signals X and Y applied to the summing means 16 and 18, the cathode ray tube beam can be caused to trace a series of substantially parallel lines on the cathode ray tube face, such as are represented by the dotted lines shown in FIGURE 1. Suitable gross deflection signals for causing the beam to follow the dotted line path in FIGURE 1, are represented in FIGURE 2. It will be noted that the gross horizontal deflection signal X in FIGURE 2 is comprised of a series of steps. Each step establishes a different horizontal position of the beam on the tube screen and therefore corresponds to one of the vertical dotted line paths in FIGURE 1. The duration of each step of the gross horizontal deflection signal X shall be referred to as a line time. During each line time, a plurality of digit times are defined. During each digit time, the gross vertical deflection signal Y defines a different step or level as shown in FIGURE 2. Thus, in response to the gross horizontal and vertical deflection signals shown in FIGURE 2, the beam will move along the dotted line path shown in FIGURE 1 and pause for a digit time duration at several positions along each vertical line trace. A typical application of the display system of FIGURE 1 is in conjunction with a calculator for displaying the contents of a plurality of number storing registers. For example, assume five different registers each capable of storing twenty four different digits. Utilizing the display format represented in FIGURE 1, each complete display cycle would be comprised of twenty four line times L1–L24 with each line time being comprised of five digit times D1–D5.

The fine horizontal and vertical deflection signals $x$ and $y$ are applied to the summing means 16 and 18 during each digit time to cause the beam to trace the composite stroke pattern shown in FIGURE 3. More particularly, the composite pattern of FIGURE 3 is essentially a figure 8 pattern and is comprised of seven strokes respectively identified as S1–S8. Stroke S0 corresponds to the time duration between the generation of successive composite stroke patterns.

In order to cause the beam to trace the composite pattern shown in FIGURE 3 during each digit time, the fine horizontal and vertical deflection signals *x* and *y* shown in FIGURE 4 are respectively applied to the summing means 16 and 18. It will be noted in FIGURE 4 that each digit time is comprised of eight stroke times T0–T7. During each of these stroke times, the beam is deflected so as to trace the correspondingly numbered stroke shown in FIGURE 3.

From the foregoing, it will be readily appreciated that in order to deflect the beam in the manner shown in FIGURE 1 to draw a plurality of composite stroke patterns as shown, it is necessary to generate gross and fine and horizontal and vertical deflection signals as shown in FIGURES 2 and 4. These signals are generated in accordance with the invention in the manner shown in FIGURE 5.

The system of FIGURE 5 utilizes a clock pulse source 30 which provides at least one pulse per stroke time. The pulses provided by source 30 are applied to a "scale of 8" counter 32 which defines the stroke times T0–T8. The counter 32 provides a carry pulse on terminal 34 for each cycle defined thereby. Thus, at the end of each stroke time T7, counter 32 provides a pulse on terminal 34 which increments a "scale of 5" counter 36. The counter 36 defines each of the different digit times D1–D5. After every digit time D5, the counter 36 provides a carry pulse on terminal 38 to increment a "scale of 14" counter 40 which defines the line times L1–L24.

The "scale of 8" counter 32 can be provided with eight output terminals, each corresponding to a different count, which are coupled to gating networks 42 and 44 respectively controlling charge storage circuits 46 and 48 which produce the fine horizontal and vertical deflection signals *x* and *y*. The "scale of 5" counter 36 has five output terminals which are applied to a gating network 50 controlling a charge storage circuit 52 producing the gross vertical deflection signal Y. The "scale of 24" counter 40 has twenty four output terminals which are supplied to a gating network 54 controlling charge storage circuit 56 producing the gross horizontal deflection signal X.

Inasmuch as each of the charge storage circuits 46, 48, 52 and 56 are substantially identical except for circuit values, detailed reference will be made only to the circuit 56.

The charge storage circuit 56 includes a capacitor C1 and a first transistor switch Q1 shown as being of the PNP type. The capacitor C1 is connected in series with the emitter-collector path of transistor Q1 across a source of reference potential. The transistor switch Q1 is controlled in response to a signal applied by gating means 54 to its base through resistor R0. The base of transistor Q1 is additionally connected through resistor R1 to the potential source terminal +V. The emitter of transistor Q1 is connected through resistor R2 to the source of positive potential +V.

It will be appreciated that when the gating network 54 applies a forward biasing signal to the base of transistor Q1, current will be drawn through the resistor R2 and the emitter collector path of transistor Q1 to thus charge capacitor C1. By proper selection of the RC time constant, the transistor Q1 will act as a constant current source to charge the capacitor C1 substantially linearly as a function of time to thus define the slopes of the wave forms illustrated in FIGURES 2 and 4.

The charge storage circuit 56 includes an output circuit comprised of field-effect transistor Q2 and resistor R3. The transistor Q2 drain is connected to the source of positive potential +V. The transistor Q2 gate is connected to the upper terminal of capacitor C1. Resistor R3 connects the transistor Q2 source to the lower terminal of capacitor C1, connected to ground.

It will be appreciated that the potential across capacitor C1 will be dependent upon the duration of the charging current applied thereto. The field effect transistor Q2 acts as an emitter follower so as to produce a potential at its source which follows the potential applied to its gate. Accordingly, a potential will be developed across resistor R3 which is substantially proportional to the charge stored in capacitor C1. It will be appreciated that transistor Q2 presents a very high impedance to capacitor C1 and accordingly does not provide a current discharge path therefor. Rather, discharging of capacitor C1 is controlled by a second transistor switch (NPN) Q3 which is connected in a circuit branch in parallel with the capacitor C1. More particularly, the collector of transistor Q3 is connected to the upper terminal of capacitor C1 through resistor R4. The emitter of transistor Q3 is connected to the lower terminal of capacitor C1. The base of transistor Q3 is connected to an output terminal of the gating network 54.

From the description of the charge storage circuit 56, it should now be recognized that the gating network 54 establishes a charge level across capacitor C1 by selectively forward biasing the transistor switch Q1 to charge the capacitor C1 and forward biasing the transistor switch Q3 to discharge the capacitor C1. In this manner, the signal provided on output terminal 62 by resistor R3 can be made to correspond to the waveforms shown in FIGURES 2 and 4. For example, each time the counter 40 is incremented, transistor switch Q1 should be closed to increase the charge level across capacitor C1. In this manner, the cathode ray tube beam can be successively deflected horizontally across the tube face as represented by the dotted line path in FIGURE 1. At the end of each cycle of counter 40, i.e. after line time L24, transistor switch Q3 will be closed to discharge the capacitor C1 to thus return the beam from the extreme right hand side of the tube screen to the extreme left hand side thereof.

As previously noted, the charge storage circuits 46, 48 and 52 are substantially identical to the charge storage circuit 56 except for perhaps the choice of circuit values which define the time constants. Accordingly, it should therefore be appreciated that the charge storage circuits 46 and 48, 52 and 56 can respectively provide the signals *x, y*, Y and X as shown in FIGURES 2 and 4.

As previously pointed out these signals will deflect the beam along the dotted line path shown in FIGURE 1 and will cause it to trace the composite stroke or figure 8 patterns at five different vertical positions on the screen and twenty four different horizontal positions.

In order to represent a particular character, selected ones of the seven strokes S1–S7 have to be blanked. Thus, in order to represent the digit "0," for example, the beam should be blanked during stroke time T1 to thus eliminate stroke S1 from the display. Blanking is controlled by a blanking means 70 which is responsive to a gating logic network 72. More particularly, character codes are successively supplied to a character register 74. The output of the character register 74 is applied to a decoding network 76. Assuming that only numeric characters are to be displayed, then the decoding means 76 would have ten different output terminals corresponding to the digits 0–9. If the 0 digit is to be displayed on the cathode ray tube, then the output terminal of the decoding means 76 corresponding thereto is energized to cause the gating logic 72 to blank the beam during stroke time T1. The stroke times are of course defined by the counter 32 and are supplied therefrom to the gating logic 72.

From the foregoing, it will be appreciated that deflection circuitry has been disclosed herein for causing a cathode ray tube beam to trace a series of successive stroke patterns in which selected strokes can be blanked to define desired characters. The system in accordance with the invention employs charge storage circuits for producing gross and fine horizontal and vertical deflection signals. The charge storage circuit utilizes a capacitor connected to first and second transistor switches which selectively establish the charge level across the capacitor. An output circuit utilizing a high impedance field-effect transistor is responsive to the charge across the capacitor for developing the deflection signal voltages.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A circuit for producing a deflection signal for application to a cathode ray tube deflection means, said circuit comprising:

a charge storage device;
a source of reference potential;
a first switch;
means connecting said charge storage device and said first switch in series across said source of reference potential;
a second switch;
means connecting said second switch in a circuit branch in parallel with said charge storage device;
output circuit means for producing an output signal having an amplitude substantially proportional to the charge stored by said charge storage device, said output circuit means including a field effect transistor having a source, a gate, and a drain, said gate being connected to said charge storage device and presenting a high impedance thereto;
first and second circuit input terminals respectively coupled to said first and second switches;
a circuit output terminal; and
means for coupling said output signal to said circuit output terminal for application to said deflection means.

2. The circuit of claim 1 wherein said charge storage device comprises a capacitor.

3. The circuit of claim 1 wherein each of said first and second switches comprises a transistor.

4. In combination with a cathode ray tube having vertical and horizontal beam deflection means, circuit apparatus for producing deflection signals for application to said deflection means, said circuit apparatus comprising:

a first circuit means for producing a gross horizontal deflection signal;

a second circuit means for producing a fine horizontal deflection signal;
a first summing means for coupling said first and second circuit means to said horizontal deflection means;
a third circuit means for producing a gross vertical deflection signal;
a fourth circuit means for producing a fine vertical deflection signal;
a second summing means for coupling said third and fourth circuit means to said vertical deflection means;
each of said circuit means including a charge storage device connected (1) in series with a first switch across a source of reference potential and (2) in parallel with a second switch;
a gating means coupled to each of said circuit means for controlling the first and second switches thereof; and
an output means included in each of said circuit means for presenting a high impedance to the charge storage device thereof and for producing an output signal having an amplitude substantially proportional to the charge stored thereby.

5. The circuit of claim 4 wherein said charge storage device comprises a capacitor.

6. The circuit of claim 4 wherein each of said first and second switches comprises a transistor.

7. The circuit of claim 4 wherein said output circuit means includes a field-effect transistor having a source, a gate, and a drain; and means connecting said gate to said charge storage device.

References Cited

UNITED STATES PATENTS 3,273,007 9/1966 Schneider ____________ 315—27

RODNEY D. BENNETT, Jr., Primary Examiner

J. G. BAXTER, Assistant Examiner

U.S. Cl. X.R.

315—27; 340—124.1